UNITED STATES PATENT OFFICE.

JACOB BUZBY, OF PHILADELPHIA, PENNSYLVANIA.

IMPROVED COMPOSITION FOR REMOVING SCALE FROM BOILERS.

Specification forming part of Letters Patent No. 47,188, dated April 11, 1865.

*To all whom it may concern:*

Be it known that I, JACOB BUZBY, of Frankford, Philadelphia, Pennsylvania, have invented a Preparation for Removing Incrustation from Steam-Boilers; and I do hereby declare the following to be a full, clear, and exact description of the same.

After a series of experiments made with various drugs and chemicals with the view of producing a fluid which, on being introduced into a steam-boiler, would remove incrustations from the same, I have discovered that a preparation composed of solutions of "gambier" (a species of catechu) and of the bark of the sweet gum-tree (liquid amber styraciflua) would effectually accomplish the desired end.

In preparing this composition I first make a decoction from about five pounds of bark boiled in water, and add to the same ten pounds of gambier, the liquid being maintained at a heat sufficient to boil it until the gambier is dissolved. The composition thus formed is then introduced into a boiler the scale of which is to be removed. I have found by practical experiments that within a short time after the introduction of the composition into the boiler the scale begins to loosen, while at the same time the formation of new scale is prevented, so that the boiler is maintained in the desired clean condition.

Although I have specified certain proportions of the materials to be used in the formation of this composition, I do not desire to confine myself to these exact quantities or to the precise mode described of compounding them; but

I claim as my invention and desire to secure by Letters Patent—

The use for removing scale from steam-boilers of a decoction of the bark of the sweet-gum tree, in combination with a solution of gambier or catechu.

In testimony whereof I have signed my name to this specification in the presence of two subscribing witnesses.

JACOB BUZBY.

Witnesses:
CHARLES E. FOSTER,
JOHN WHITE.